UNITED STATES PATENT OFFICE.

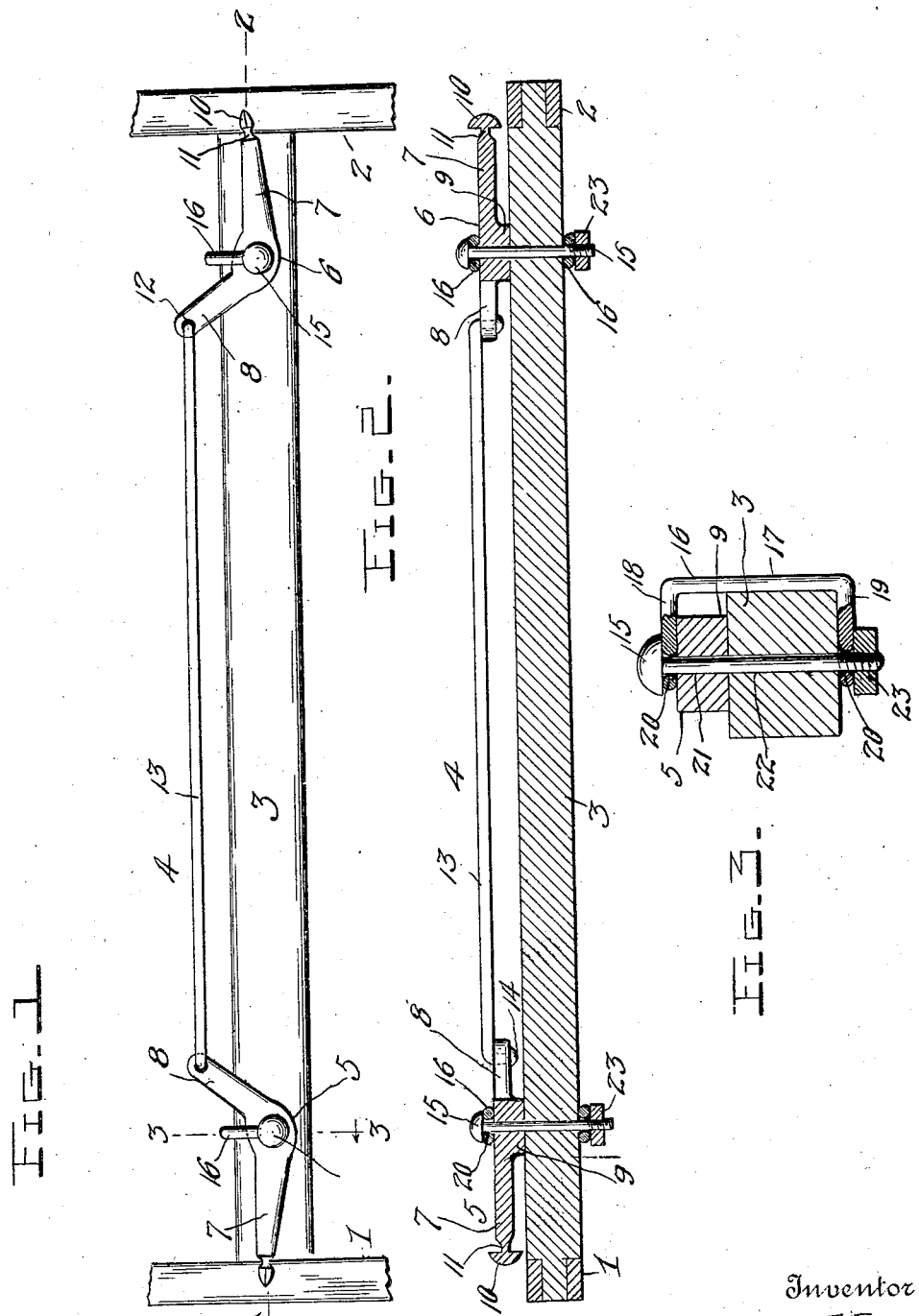

JAMES E. MOAN, OF VINCENNES, INDIANA.

WHIFFLETREE.

No. 880,231.        Specification of Letters Patent.        Patented Feb. 25, 1908.

Application filed February 19, 1906. Serial No. 301,866.

*To all whom it may concern:*

Be it known that I, JAMES E. MOAN, a citizen of the United States, residing at Vincennes, in the county of Knox and State of Indiana, have invented certain new and useful Improvements in Whiffletrees; and I do declare the following to be a full, clear, and exact description of the invention, such as will enable others skilled in the art to which it appertains to make and use the same.

My invention relates to improvements in whiffletrees for use on the shafts of buggies and other vehicles, and it consists in the novel construction, combination and arrangement of parts hereinafter described and claimed.

The object of the invention is to provide a device of this character which will be of simple and comparatively inexpensive construction and very durable and efficient in operation.

The above and other objects which will appear as the nature of my invention is better understood, are accomplished by means of the construction illustrated in the accompanying drawings, in which,—

Figure 1 is a plan view of a portion of the shafts of a vehicle, showing my improved whiffletree applied thereto; and Figs. 2 and 3 are sectional views, taken, respectively, on the planes indicated by the lines 2—2 and 3—3 in Fig. 1.

Referring to the drawings by numeral, 1 and 2 denote the shafts of a vehicle of any description, and 3 denotes the usual cross-bar which connects them adjacent to their rear ends. My improved whiffletree 4 is mounted upon the top of this cross-bar and lies entirely in rear of its forward edge, so that it will not interfere with the animal between the shafts. It comprises two bell-cranks 5, 6, which are similar in form and construction, but which are oppositely-disposed adjacent to the opposite ends of the cross-bar. Each of said bell-cranks is cast, or otherwise formed, from a single piece of metal, and consists of an outwardly-projecting lateral arm 7 and an inwardly and rearwardly-projecting arm 8, the thickened portion of the bell-crank at the junction of the two arms being formed upon its under face with a boss 9, which spaces said arms above the upper surface of the cross-bar 3. The outwardly-projecting lateral arm 7 to which the usual trace is adapted to be connected tapers slightly and is formed with a vertically-extending flattened head or button 10, a reduced neck 11, connecting the latter to the arm 7, as shown. In applying the trace to the arm 7, the eye in the end of the trace is slipped over the button or head 10 while said eye is vertically disposed, and the trace is then turned upon the neck 11, so that the button or head will retain it upon the bell-crank. The inwardly and rearwardly extending arms 8 of the bell-cranks are apertured, as at 12, and are connected by a transversely-extending bar or link 13. The latter has its ends pivotally connected to the arms 8 by bending them at right angles, passing them through the openings 12 in said arm and heading them as shown at 14. By having the arms 8 extend rearwardly, the rod 13 will be disposed in rear of the cross-bar, and will not interfere with the horse's tail, the harness, or other parts of the vehicle. The bell-cranks 5, 6, are pivotally mounted upon the top of the cross-bar 3, by pivot bolts 15 and U-shaped clips 16, which latter are adapted to serve as stops to limit the swinging movement of the bell-cranks. The clips 16 have their vertical connecting bars 17 engaged with the rear face of the cross-bar 3, and their parallel arms 18, 19, engaged with the upper faces of the bell-cranks and the bottom of the cross-bar, as shown in Fig. 3 of the drawings. In these upper and lower arms 18, 19, are provided eyes 20, which register or aline with vertical openings 21, 22, formed in the bell-cranks and cross-bar. The pivot bolts 15 extend through the eyes 20 and the openings 21, 22, their round heads being uppermost and suitable nuts 23 being secured upon their projecting, lower, screw-threaded ends, as shown.

The construction, operation and advantages of the invention will be readily understood from the foregoing description, taken in connection with the accompanying drawings. It will be seen that by constructing the bell-cranks and mounting them, as shown, upon the top of the cross-bar 3, so that they project outwardly and rearwardly, they will not in any way interfere with the animal between the shafts, and straps or portions of the harness will not readily become caught in them. They are of simple, durable and comparatively inexpensive construction and may be quickly mounted upon the shafts of either old or new vehicles without in the slightest degree weakening the cross-bar. The whiffletree is exceedingly strong and durable since strain on the cross-bar is equalized or distributed.

Various changes in the form, proportion and the minor details of construction may be resorted to without departing from the principle or sacrificing any of the advantages of this invention, as defined by the appended claims.

Having thus described my invention, what I claim as new, and desire to secure by Letters-Patent, is,—

In a device of the class described and in combination with a cross-bar, of a pair of bell cranks disposed respectively adjacent opposite ends thereof and each having a longitudinal outwardly extending arm and a rearwardly extending arm, the said bell cranks being provided on their inner faces at their elbows with bosses which space the arms from the cross bar, vertical pivoting bolts extending through the cross bar and bell cranks at the elbows of the latter, U-shaped clips having upper and lower arms bearing respectively upon the adjacent outer faces of the bell cranks and cross bar and provided with eyes to receive the pivoting bolts, the vertical portions of the clips being disposed to bear against the rear face of the cross bar, and to be held rigid thereby to form stops for limiting the pivotal movement of the bell cranks, and a rod extending between and pivotally connected with the rearwardly extended arms of the bell cranks.

In testimony whereof I have hereunto set my hand in presence of two subscribing witnesses.

JAMES E. MOAN.

Witnesses:
   CHAS. MICURE,
   F. W. BRANDENBURG.